(12) United States Patent
Santamaria (10) Patent No.: US 8,920,652 B2
(45) Date of Patent: Dec. 30, 2014

(54) METHOD AND APPARATUS FOR A LAGOON BATCH TREATMENT SYSTEM

(75) Inventor: Joseph Santamaria, Alexandria, NH (US)

(73) Assignee: JPS Industries, Inc., Bristol, NH (US)

( * ) Notice: Subject to any disclaimer, the term of this patent is extended or adjusted under 35 U.S.C. 154(b) by 513 days.

(21) Appl. No.: 13/288,655

(22) Filed: Nov. 3, 2011

(65) Prior Publication Data

US 2012/0103445 A1    May 3, 2012

Related U.S. Application Data

(60) Provisional application No. 61/409,621, filed on Nov. 3, 2010.

(51) Int. Cl.
  *C02F 3/02* (2006.01)
  *F17D 3/00* (2006.01)
  *E02B 7/00* (2006.01)

(52) U.S. Cl.
  CPC ... *F17D 3/00* (2013.01); *C02F 3/02* (2013.01); *E02B 2201/02* (2013.01); *E02B 7/005* (2013.01); *C02F 2203/006* (2013.01)
  USPC ............... 210/620; 210/747.6; 210/747.9; 210/170.05; 210/170.06; 210/170.09; 210/242.1

(58) Field of Classification Search
  CPC .... C02F 3/02; C02F 3/1236; C02F 2203/006; C02F 2307/00; E02B 7/005; E02B 2201/02; E03F 5/103
  USPC ............... 210/601, 620, 747.1, 747.6, 747.9, 210/170.01, 170.05, 170.06, 170.08, 210/170.09, 242.1; 405/74, 115, 210
  See application file for complete search history.

(56) References Cited

U.S. PATENT DOCUMENTS

| | | | | | |
|---|---|---|---|---|---|
| 4,231,873 | A | * | 11/1980 | Swigger | 210/170.05 |
| 4,377,477 | A | * | 3/1983 | Dunkers | 210/242.1 |
| 4,664,792 | A | * | 5/1987 | Fors et al. | 210/170.05 |
| 4,944,872 | A | * | 7/1990 | Kantor | 210/170.05 |
| 5,080,783 | A | * | 1/1992 | Brown | 210/170.05 |
| 5,472,611 | A | * | 12/1995 | von Nordenskjold et al. | 210/626 |
| 5,811,011 | A | * | 9/1998 | Ciszczon et al. | 210/620 |
| 6,576,141 | B2 | * | 6/2003 | Turner et al. | 210/242.1 |
| 6,743,367 | B2 | * | 6/2004 | Dreyer | 210/747.6 |

OTHER PUBLICATIONS

U.S. Appl. No. 12/956,662, filed Nov. 30, 2010, Santamaria, Joseph P.

* cited by examiner

*Primary Examiner* — Christopher Upton
(74) *Attorney, Agent, or Firm* — Zip Law PLLC; Claire Zopf (57) ABSTRACT

A lagoon batch wastewater treatment system for a wastewater treatment lagoon wherein a containment tank expands and contracts during a sewage treatment process reducing erosion of the berm or bank of the lagoon.

15 Claims, 11 Drawing Sheets

METHOD AND APPARATUS FOR A LAGOON BATCH TREATMENT SYSTEM

This application claims the benefit of U.S. provisional application No. 61/409,621 filed Nov. 3, 2010 and entitled Method and Apparatus for a Lagoon Batch Treatment System, which is hereby incorporated herein by reference in its entirety.

FIELD OF THE INVENTION

The present invention relates to lagoon batch wastewater treatment system for a wastewater treatment lagoon, and more particularly to a containment tank that expands and contracts during a sewage treatment process reducing erosion of the berm or bank of the lagoon.

BACKGROUND OF THE INVENTION

Conventional lagoon based wastewater treatment systems rely generally on open air lagoons to permit aerobic and anaerobic treatment of wastewater. A lagoon is any earthen basin for containing a body of water, such as a treatment reactor cell. Lagoons and other wastewater treatment ponds or basins are typically constructed by excavating land to create a reservoir area. If desired, berms can then be built around the perimeter of the reservoir area to extend the walls of the reservoir above ground level. Quite often, a lagoon is lined with a layer of clay to serve as a barrier. For example, environmental regulations typically require a subgrade clay layer of uniform thickness, for example 5 feet thick and having uniform water content. Often times a plastic liner made of high-density polyethylene may be placed over the entire interior surface defined by the reservoir and the berm area. The liner is made of sheet strips of high density polyethylene (HDPE) which overlap in an abutting fashion and are then welded or cemented together to create a water impermeable and erosion control line.

Once the lagoon is constructed and lined the wastewater liquid or sludge material is then pumped into the lagoon on top of the liner and/or the clay which is lining the lagoon. This liner facilitates not only maintaining the wastewater in the reservoir or lagoon but also in maintaining any turbulent water flow in the surface from eroding the berm and banking of the lagoon. The lagoon or pond is subject to water fluid level changes as well as a turbulence of the surface in particular from aeration of the wastewater which can erode the banking and the berm. The liner is instrumental in protecting the underlying clay and soil lining forming the lagoon particularly where the turbulent water contacts the berm and banking.

Lagoon based water treatment systems require a large amount of space, on the order of several acres and often necessitate the large interior encompassing liner in conjunction with the lagoon construction to facilitate containment of the wastewater and to prevent erosion of the banking around the lagoon. This is tremendously expensive where an entire lagoon system must be covered with a liner, not only upon initial construction but upon replacement or fixing of a compromised liner.

Such traditional lagoon-based liner systems have several shortcomings. Because of the large size of the liners where the liners cover the entire interior of the lagoon, the liners which are generally impermeable material must be constructed on-site usually in large strips, where the strips are heat sealed together along their edges after being placed in an empty lagoon. This of course means that the lagoon must be emptied and cannot be used for the time period in which the new liner material is placed inside. It is tremendously labor intensive, time-consuming and expensive to assemble such liners and empty the lagoons if a liner needs to be fixed or replaced.

Additionally, multiple floating "tanks" are required to treat screened sewage within the lagoon. Waste water must be pumped into and out of each lined containment structure before and after treatment, respectively. For this operation, each tank for example may have a static volume of approximately 1,437,500 gallons and be able to turnover 437,500 gallons with pumps adding and removing the waste at a peak flow of approximately 5600 gallons per minute (gpm). A reduction in costs in maintaining the liners and containment structures is needed with minimal maintenance requirements and delays in operation.

OBJECT AND SUMMARY OF THE INVENTION

The expandable containment system of the present invention is a significant savings in material and man-hours to implement because the lagoon does not need to be drained, or operation even interrupted in most cases to construct and implement the containment liner system. The liner is in effect a containment area within the lagoon that is able to expand and contract to accommodate the addition and removal of waste during the sewage treatment.

An object of the invention is that the containment system be formed with minimal construction efforts into any suitable dimension to accommodate waste flow.

Another object of the invention is that the containment system expands and contracts without rupture as waste flow is pumped into and out of the containment liner system.

Another object of the invention is that turbulence with in the lagoon is contained, reducing and preventing erosion and wear to the banking and berm of the lagoon.

Another object of the invention is that the containment system is reliable, flexible and has minimum maintenance requirements.

Another object of the invention is that the panels of the liner be fit together by a simpler less labor intensive means.

A further object of the invention is that transportation and assembly of the batch treatment system is straightforward and has minimal infrastructure requirements.

The present invention is directed toward a lagoon batch treatment system for treating fluid in a lagoon comprising a floating ring supporting a containment curtain in the lagoon having a first end affixed to the floating ring and a second end depending substantially below the first end to define a containment portion of the lagoon; a ballast affixed to the second end of the containment curtain; and a pump apparatus for providing fluid into the containment portion of the lagoon and pumping fluid out of the containment portion; and wherein the containment portion has a variable volume depending on at least one of the pressure and volume inside the containment portion.

The present invention is also directed to a method of treatment of sewage within a lagoon comprising the steps of affixing one or more buoyant sections to a first end of a containment curtain; affixing a ballast to a second end of the containment curtain; connecting a first end of the one or more buoyant sections to a second end of the one or more buoyant sections to form the containment curtain in a ring; submerging the second end and the ballast of the containment curtain in a lagoon; and varying the volume inside the containment curtain by pumping fluid in and out of an area defined within the containment curtain.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which.

DETAILED DESCRIPTION OF THE INVENTION

Figure 1:
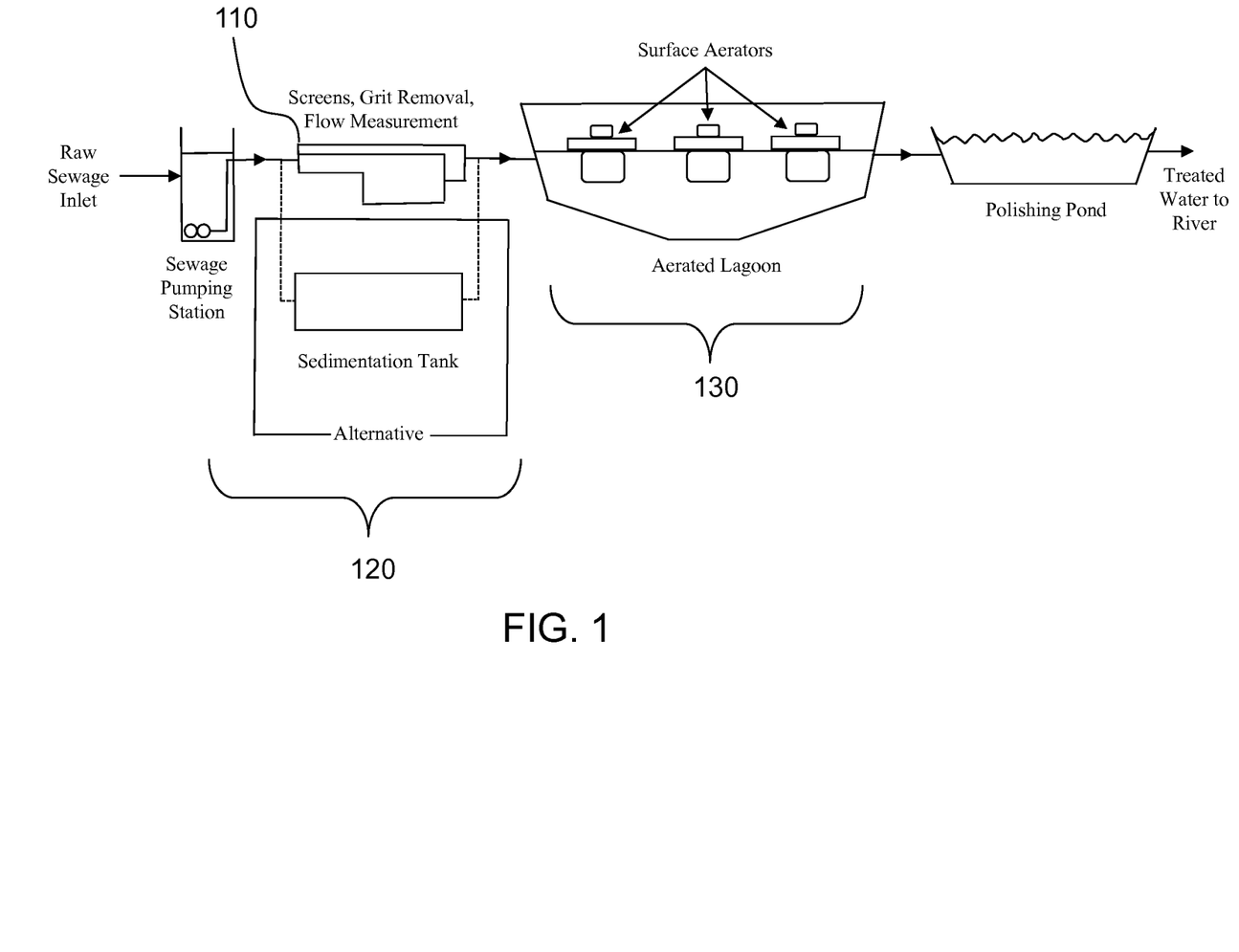
FIG. 1 is a diagrammatic representation of a wastewater treatment plant.

FIG. 1 is a diagrammatic representation of a wastewater treatment plant having a pretreatment process 110, a primary treatment process 120 and a secondary treatment process 130. The pretreatment 110 removes heavy materials such as trash, leaves, branches, etc., that can easily be collected from raw wastewater before damage is caused by clogging pumps or skimmers in the primary and secondary treatment processes. Pre-treatment may include screening the wastewater for such heavy materials by use of a screen or a rake passed through the wastewater to accumulate the heavier material on the screen which can then be removed manually or mechanically. Also, the flow of the wastewater may be adjusted to allow settlement of sand gravel, stones and broken glass for example. Particles of this type or kind can also damage pumps and other equipment in the treatment facility.

In primary treatment 120 the wastewater generally flows into large tanks called clarifiers, or sedimentation tanks, and these are used to initially settle sludge and to allow grease and oil accumulating on the surface where it can be skimmed off. The primary treatment 120 can include settling tanks equipped with the mechanically driven scrapers to drive the sludge towards a hopper in the base of the tank and skimmers at the surface for collecting the grease and oil, often times referred to as sapofication.

The wastewater is then transferred generally via a pump to a secondary treatment process 130 which often entails a lagoon or pool where most conventional water treatment facilities use aerobic biological processes to break down the biological materials in the wastewater. These aerobic processes require sufficient oxygen and food so that this aeration can take place for example in the lagoon. The aerators are often motor driven aerators floating on the surface of the wastewater in the lagoon. This aeration often causes a significant turbulence on the surface of the water which then of course propagates outwards to the edges of the lagoon. Over time this turbulence if significant can wear away the banking and berm potentially compromising the lagoon. The containment system described in further detail below ensures that such turbulence does not erode the banking of the lagoon and that use of this device does not impact the operation or efficiency of the lagoon.

Figure 2:
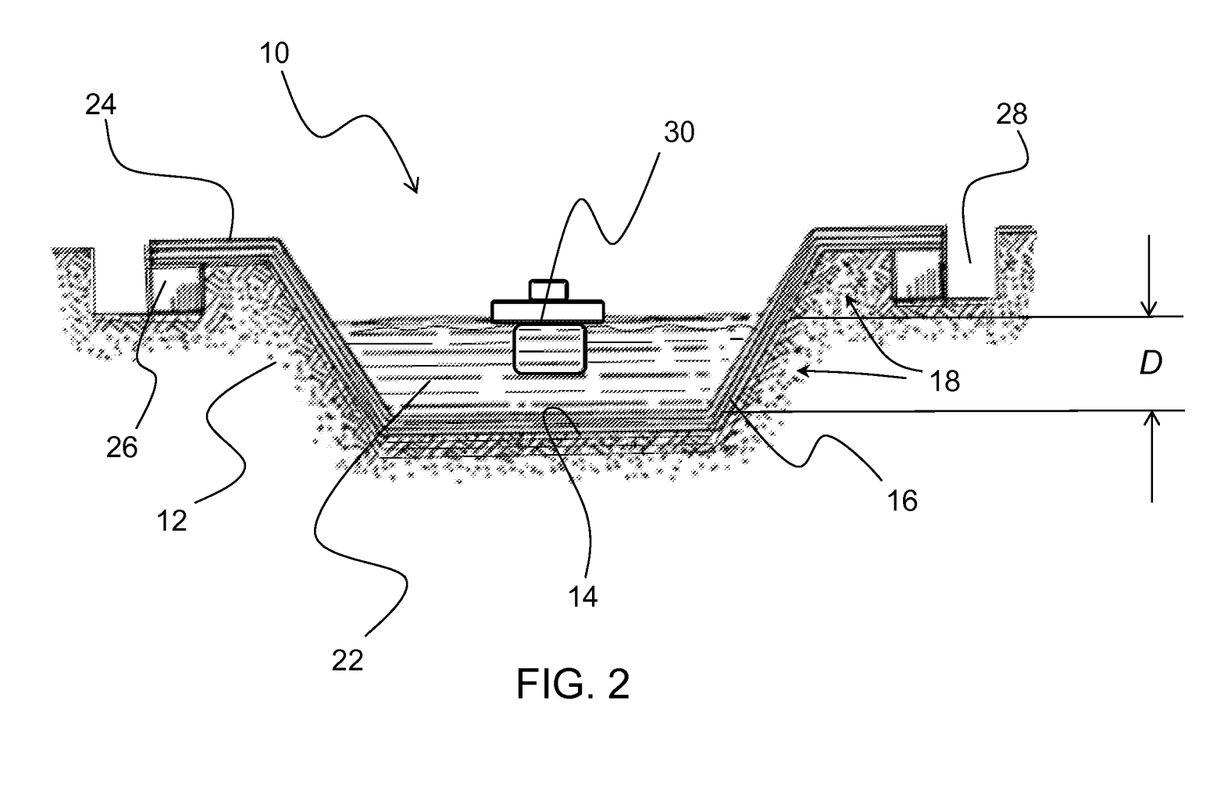
FIG. 2 is a cross section of a lagoon.

FIG. 2 is a cross-section of a lagoon 10 having a depth D with the cross-hatching indicating a soil layer 12 which can be a clay layer or other type of porous, semi-porous or non-porous soil defining the lagoon itself. The lagoon 10 has a bottom 14, a banking 16 and a berm 18 is built up to form a rim around the lagoon 10 which helps contain the wastewater 22. A lagoon liner 24 is set in place covering the entire interior surface area of the lagoon 10 and the berm 18. As shown in FIG. 2 the liner 24 stretches across the entire bottom 14, banking 16 and berm 18 of the lagoon 10 and is fastened to a retaining wall 26 which encircles the lagoon 10 and supports the berm 18. The banking 16 and berm 18 may be at any slope and commonly a trench 28 is built within which the retaining wall 26 is positioned.

An aerator 30 may be positioned in the lagoon 10 to supply oxygen to the wastewater 22. An ample oxygen supply in a wastewater lagoon is the key to rapid and effective wastewater treatment. Oxygen is needed by the bacteria to allow their respiration reactions to proceed rapidly. The oxygen is combined by the bacteria with carbon to form carbon dioxide. Without sufficient oxygen being present, bacteria are not able to quickly biodegrade the incoming organic matter. In the absence of dissolved oxygen, degradation must occur under septic conditions which are slow, odorous and yield incomplete conversions of pollutants. Under septic conditions without aeration, some of the carbon will react with hydrogen and sulfur to form sulfuric acid and methane. Other carbon will be converted to organic acids that create low pH conditions in the ponds and make the water more difficult to treat. For example, treated ponds designed to biodegrade wastewater pollutants without oxygen often must hold the incoming sewage for six months or longer to achieve acceptable levels of pollution removal. This is because the biodegradation of organic matter in the absence of oxygen is a very slow kinetic process.

Motor driven, mechanical aerators provide a combination of liquid aeration and mixing. Some mechanical aerators produce the gas-liquid interface by entraining air from the atmosphere and dispersing it into bubbles. Other types disperse liquid in the form of droplets or they produce jets or thin films as a spray that contact the ambient air. Some other types even generate both liquid droplets and air bubbles. Mechanical aerators create turbulence on the surface of the pond, this turbulence is beneficial in that turbulence facilities gas-liquid interface however, the turbulence has consequential side effects where the turbulence reaches to the banking and berms of the lagoon and creates erosion where no liner is utilized. Until now, the only solution to such erosion has been to ameliorate the effects by using a full lagoon liner as shown and described in FIG. 2.

Figure 3:
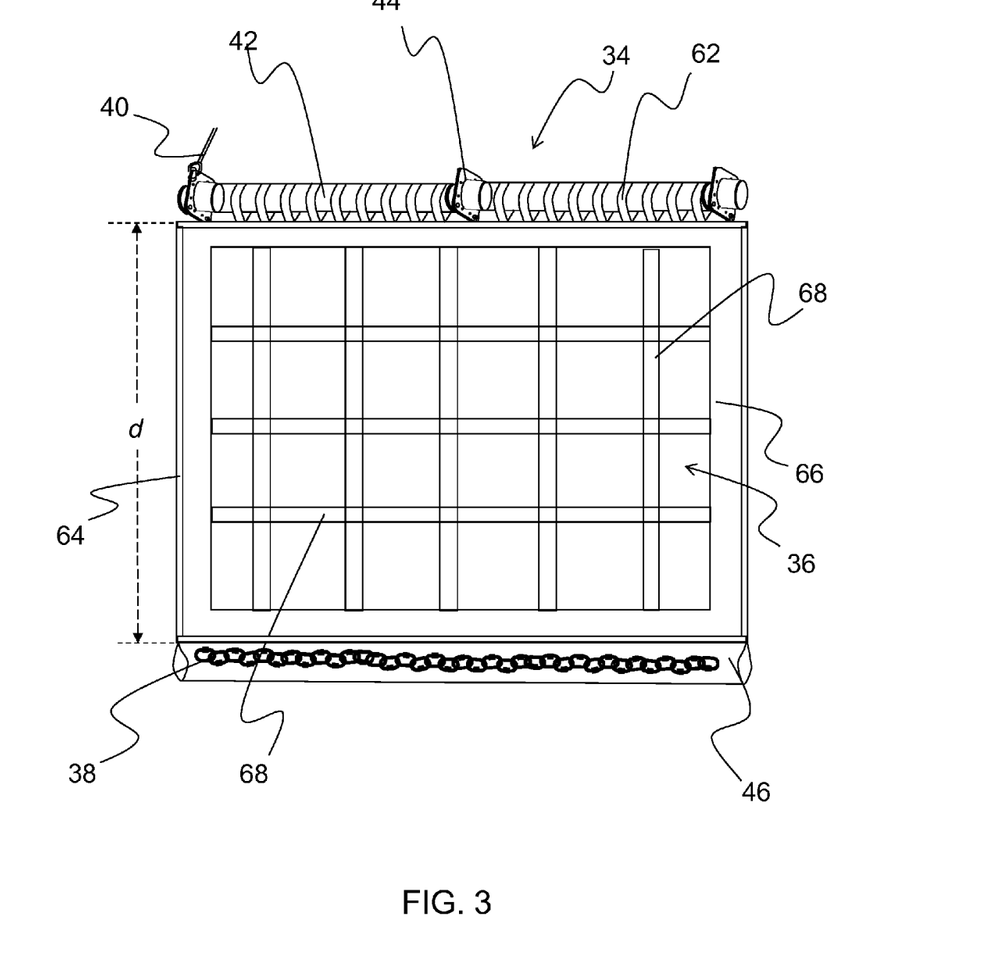
FIG. 3 is a panel of a first embodiment of the containment system of the present invention.

The lagoon batch treatment system (LBTS) of the present invention is essentially a floating tank 32 which consists of a floating ring 34, containment curtain 36 and chain ballast 38 as shown in FIG. 3. The system is kept on station within a treatment pond or lagoon 10 by means of mooring lines 40. The general dimensions of the LBTS floating tank 32 may be of any diameter that fits within the confines of the lagoon 10 and be of a depth d that approximates the depth D of the tank. The floating ring 34 of the containment system may be fabricated from high density polyethylene (HDPE) piping 42 or piping having similar characteristics and aluminum or other materially comparable fittings 44. The structure may be formed having any number of sides by bolting the fittings together. This floating ring 34 supports the top edge of the containment curtain 36 which extends along the floating ring 34 and defines an upper perimeter of the treatment tank. The containment curtain 36 depends to the depth D similar to that of the treatment tank which may be for example 16 feet deep. Chain 38 is attached to or contained within the lower portion of a baffle 46 providing ballast and retaining the shape of lower edge of the floating tank 32. The lower edge of the floating tank 32 may or may not be secured to the lagoon bottom with mooring lines 40 and screw-type anchors (not shown). The following describes the system components in more detail.

Figures 4A, 4B:
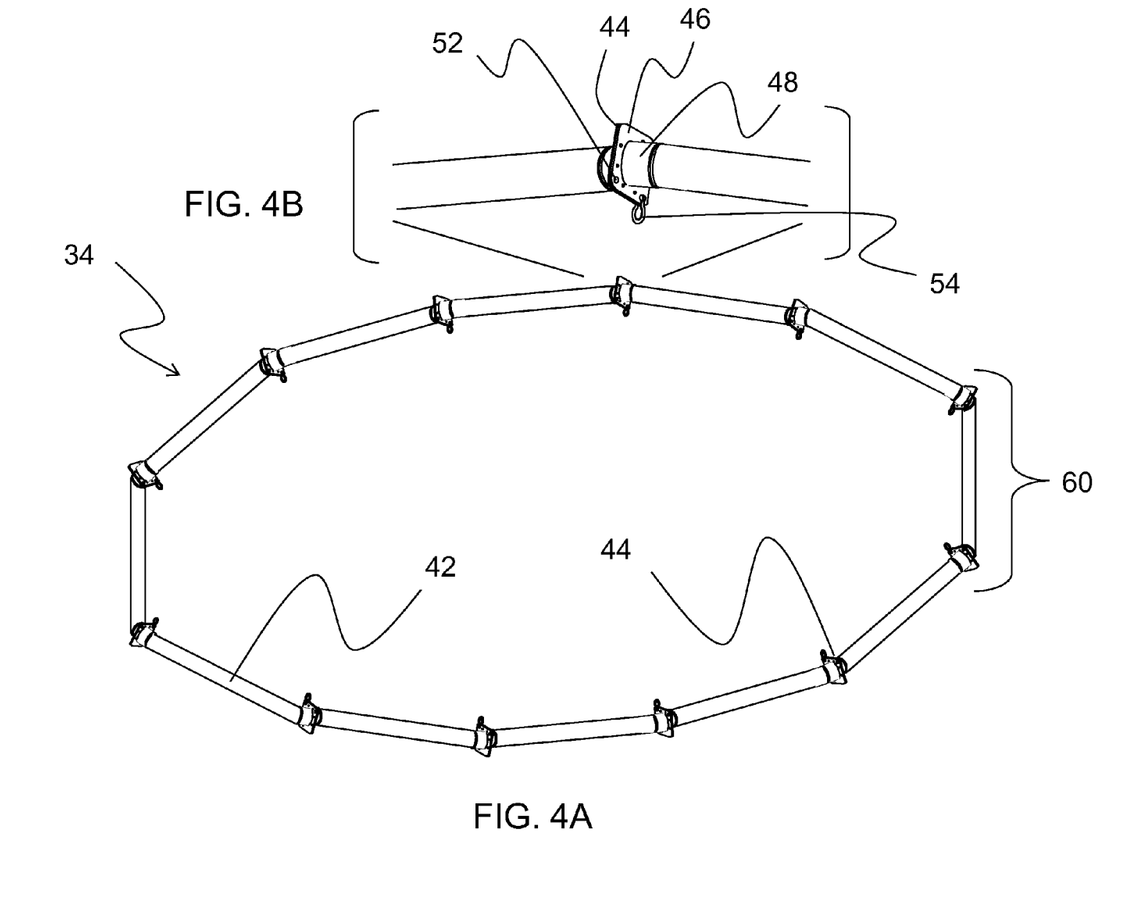
FIG. 4A is a perspective view of an upper ring of a first embodiment of the containment system of the present invention.
FIG. 4B is an exploded view of the upper ring of a first embodiment of the containment system of the present invention.
Figures 5A, 5B, 5C:
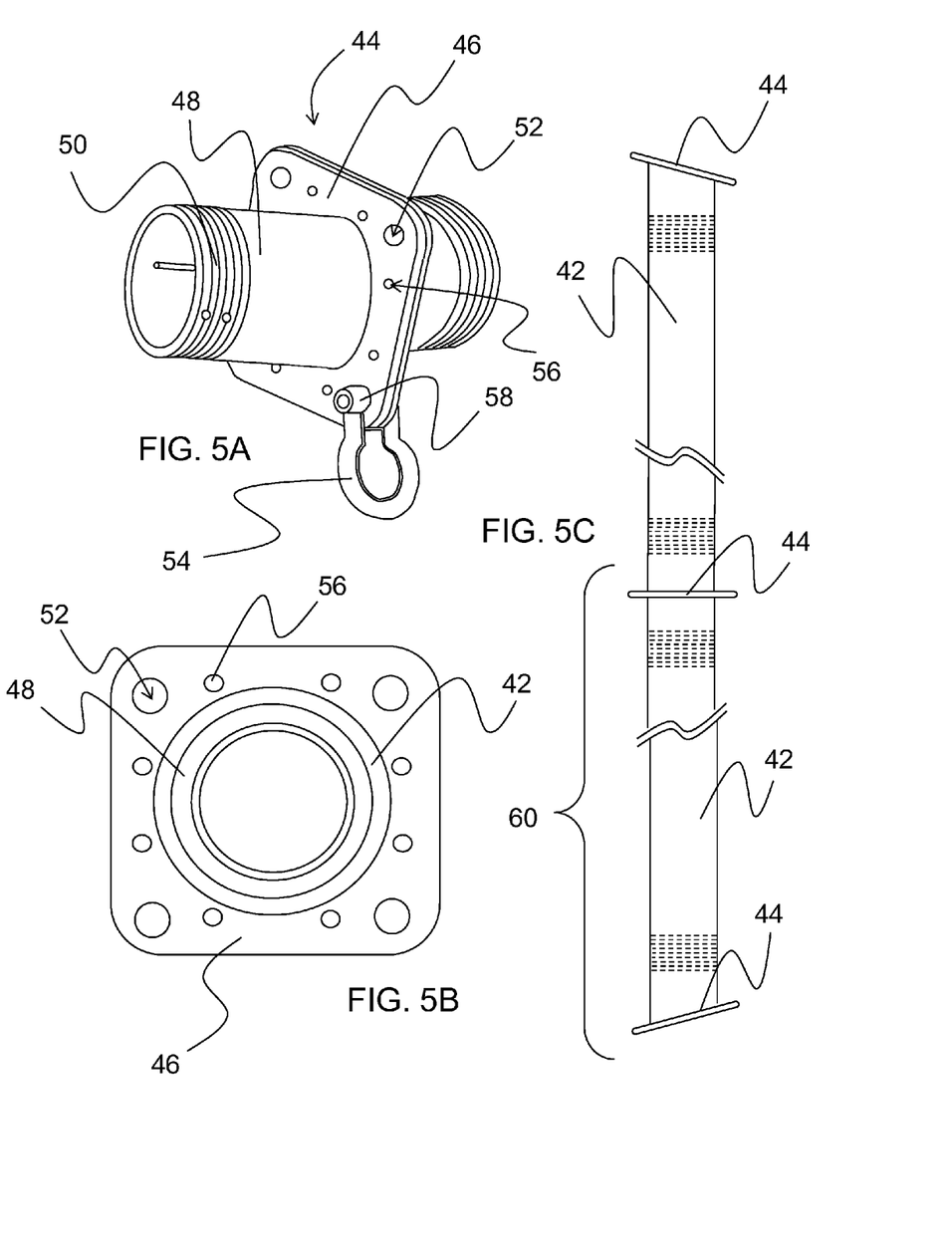
FIG. 5A is a perspective view of a fitting of a first embodiment of the containment system of the present invention.
FIG. 5B is a elevation view of a fitting of a first embodiment of the containment system of the present invention.
FIG. 5C is a perspective view pipe sections and fittings of the containment system of the present invention.

The floating ring 34 as shown in FIG. 4A is designed to ease the transportability, construction, and maintenance of the system. The ring 34 consists of a number of sections of plugged high density polyethylene pipe 42 secured together with aluminum fittings 44 as shown in FIGS. 4A-B. Each pipe segment is individually plugged, such that the system can be assembled on land or water. The fittings 44, shown in FIGS. 5A-5C, have a base plate 46 and one or more extension connectors 48 that may extend perpendicularly to the base plate 46 to connect and extend a section of pipe 42 as shown in FIG. 5B. In another embodiment, shown in FIG. 5A each extension connector 48 may extend at a desired acute angle from the base plate 46. This provides for a circular shape to be formed as multiple sections of pipe 42 are connected together as shown in FIG. 4A. The pipe 42 may be screwed onto threads 50 on the fitting 44, or bolted, glued onto the fitting 44 or otherwise secured using suitable hardware adhesive or friction fit. Anti-seizing lubricant may be used to ease future disassembly. These fittings 44 cap each end of the pipe sections 42 to form the upper superstructure of the LBTS floating tank 32.

Each fitting 44 has one or more auxiliary openings 52 to provide for attachment of the curtain 36 to the floating ring 34 or for attachment of mooring shackles, clip fasteners or other types of hardware. For example, a shackle 54 may be used for attachment of mooring lines 40. Other openings 56 provide for one or more pieces of other auxiliary equipment to be attached to the ring 34. To isolate the aluminum fitting 44 and (traditionally) steel shackles 54, a bushing 58 may be inserted into the auxiliary openings 52 of each bolted plate.

By way of example, each pipe 42 and fitting sub-assembly 44 may consist of one 31.6 foot length of HDPE DR17 pipe and two aluminum fittings 44. The section 60 may be pre-assembled such that the end users will only have to bolt them together and suspend the curtain 36 to complete the system 32. Each pipe segment 60 may weigh approximately 200 lbs making them easily moveable. Some examples of general physical and geometric properties of each pipe segment 60 are listed in Table 1. In further embodiments, the aluminum fittings could be replaced by HDPE joints or flanges.

TABLE 1

Flotation ring segment geometric properties.

| Parameter | Value |
| --- | --- |
| Segment length (pipe and 2 fittings) | 32.35 ft |
| Segment weight | 200 lbf |
| Segment buoyancy | 794 lbf |
| HDPE pipe diameter (OD) | 8.625 in |
| HDPE pipe length | 31.6 ft |
| HDPE pipe weight | 176.2 lbf |
| Fitting weight | 12.28 lbf |

The containment curtain 36 may consist of XR-5 6130 geomembrane material manufactured by Seaman Corporation or another comparable material of similar properties. The containment curtain 36 may be primarily constructed of polyester and Table 2 provides an example of the general geometric and material properties of one embodiment of the containment curtain 36. The length of the curtain material and depth d shown in the table are an example to demonstrate the material properties of the curtain material.

TABLE 2

The XR-5 curtain material properties.

| Parameter | Value |
| --- | --- |
| Length L | 433 ft |
| Depth d | 22 ft |
| Thickness | 0.03 in |
| Density | 83.3 lb/ft$^3$ |
| Modulus of Elasticity | $6.364 \times 10^4$ psi |
| Yield Stress (tensile) | $1.4 \times 10^4$ psi |

To reinforce the material, as shown in FIG. 3, nylon webbing 68 is sewn into the fabric for example at 5 ft increments, vertically and horizontally. The edges of a curtain segment 66 may include outer webbing 64, for example 3 inches, and may typically be used to frame the curtain segment 66 with webbing to support the interior and facilitate connection with an adjacent curtain segment 66. Table 3 lists the webbing material properties.

TABLE 3

The nylon webbing material properties.

| Parameter | 2 inch webbing | 3 inch webbing |
| --- | --- | --- |
| Thickness | 0.08 in. | 0.13 in. |
| Modulus of Elasticity | $1.247 \times 10^5$ psi | $6.885 \times 10^4$ psi |
| Yield Stress (tensile) | $4.374 \times 10^4$ psi | $5.770 \times 10^5$ psi |

Figure 6:
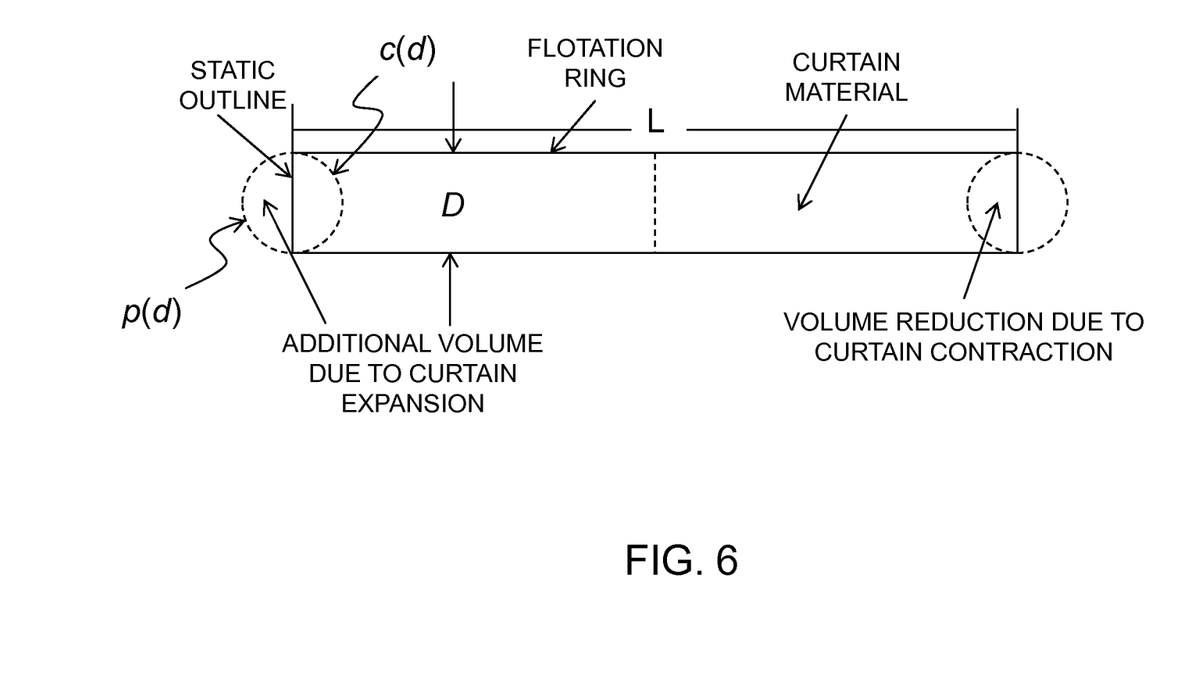
FIG. 6 is a diagrammatic representation of an embodiment of the containment system of the present invention.

The top edge of the curtain 36 may also be secured to the floating ring 34 by nylon webbing 62 spaced approximately every 1 ft, to form the main water containment structure. Any number of floating tanks 32 can be used in a lagoon to treat screened sewage. The lagoon may have for example a 16 ft depth D, but the depth d of the floating tank curtain may be for example 22 feet as in the table above. Waste water may be pumped into and out of the containment structure before and after treatment, respectively. In this example, each tank 32 has a static or neutral state volume of 1,437,500 gallons and is able to turnover 437,500 gallons with pumps adding and removing the waste at a peak flow of 5600 gallons per minute (gpm). Water is driven into and out of each of the chambers by pumps. Each water treatment chamber in this example is capable of holding up a maximum of 1,701,000 gallons with a turnover volume of 446,000 gallons. Therefore the LBTS containment tank 32 must be sized for example such that 446,000 gallons of waste can be added to the system, treated and purged. To do this, the curtain 36 is sized to "bulge" with the depth d of the curtain 36 expanding outwards so that the curvature of the expanded curtain 36 has a circumferential length p (d) when water is added to the tank as shown in FIG. 6 and "collapse" when water is removed as also shown in FIG. 6, the contracted curtain has a circumferential length of c (d).

Figure 7A:
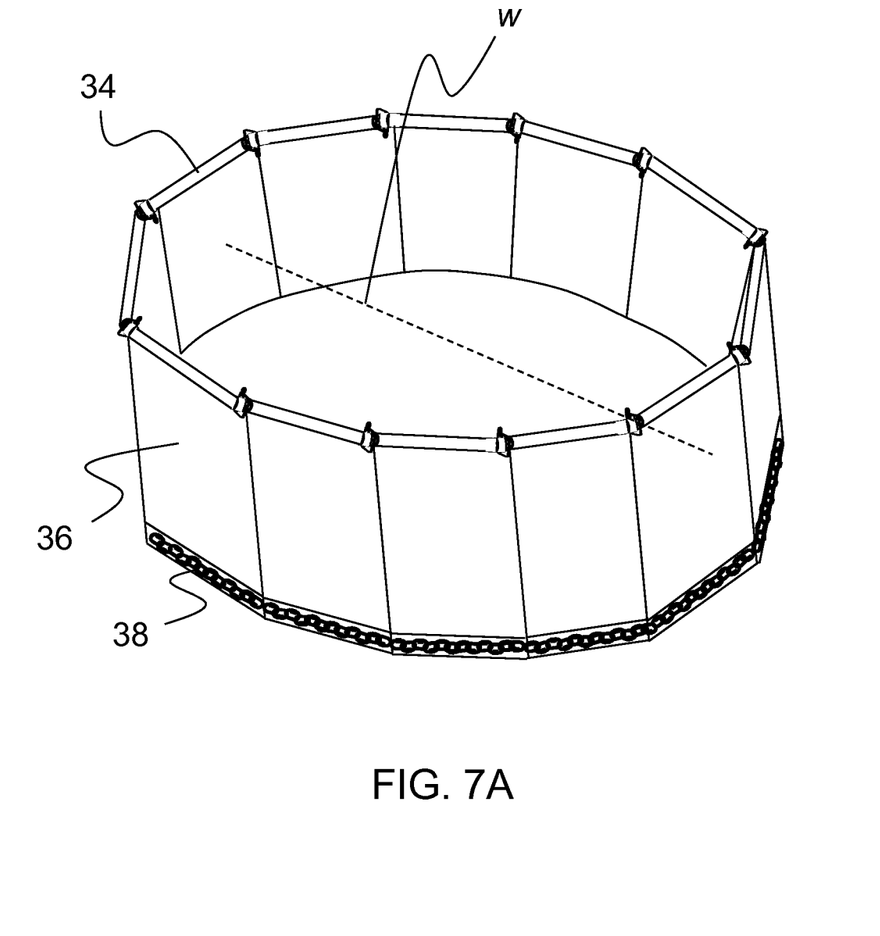
FIGS. 7A-7C is an embodiment of the containment system of the present invention in a neutral, expanded and contracted states respectively.
Figure 7B:
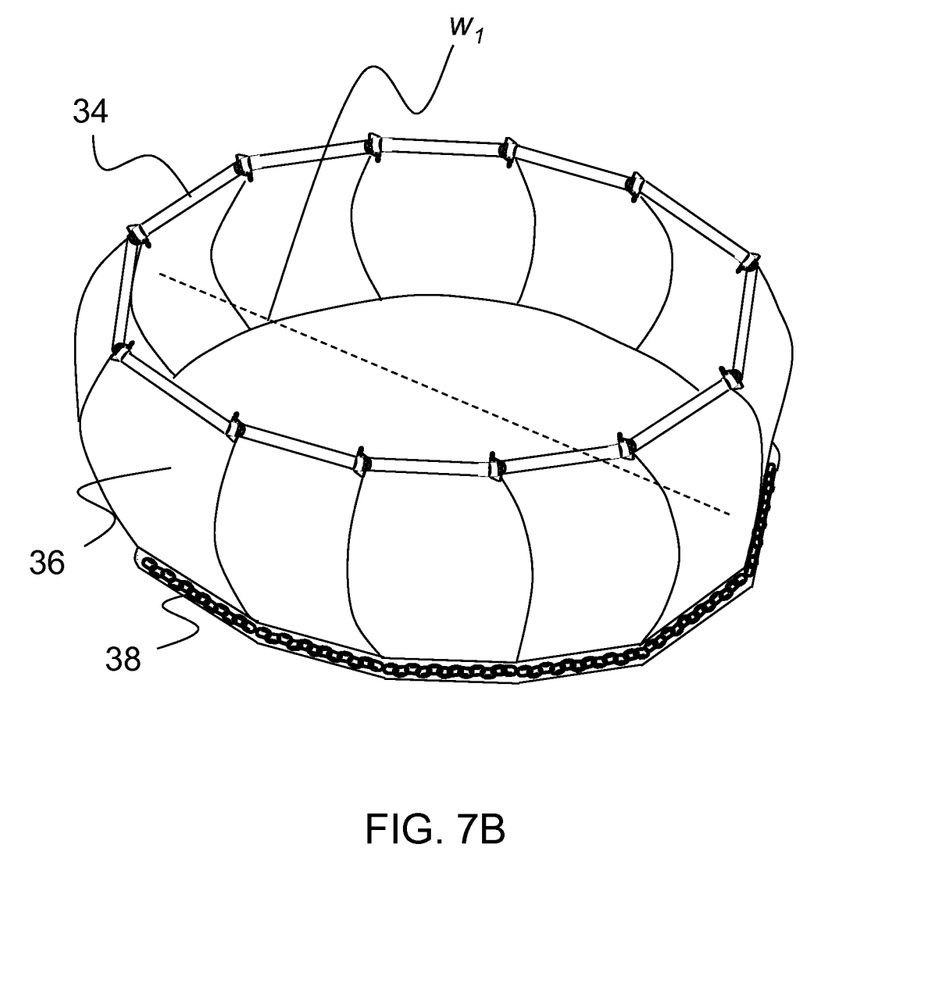
Figure 7C:
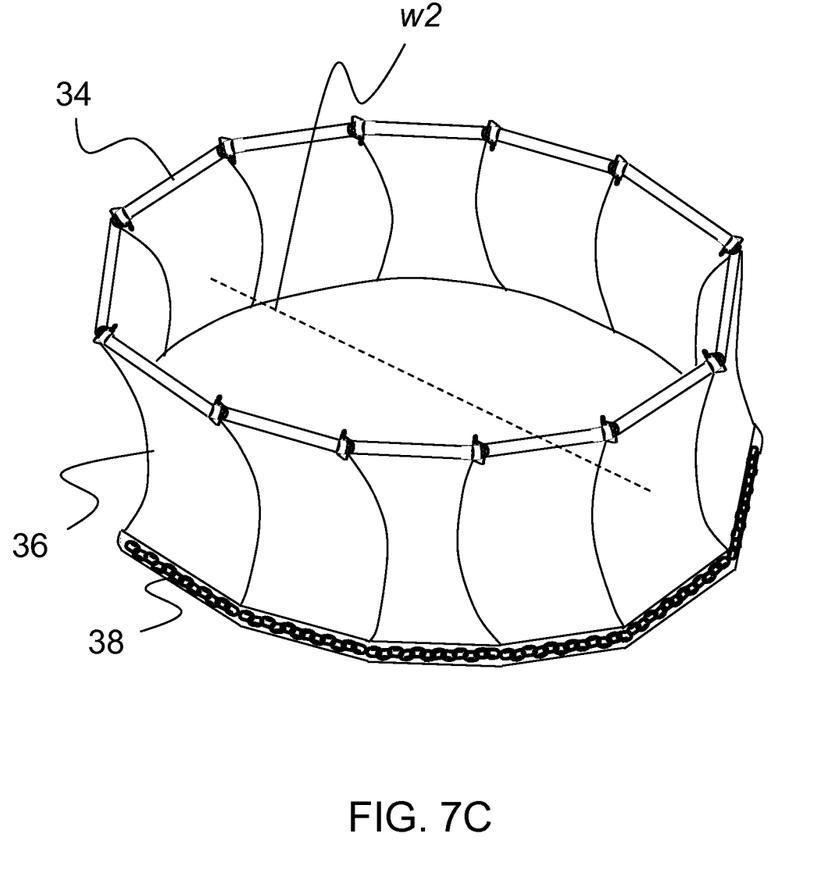

As shown in FIG. 7A the containment tank 32 in a static or neutral position has a diameter w as the water pressure inside and outside the tank is essentially in equilibrium. As waste water is pumped into the tank 32, the curtain 36 expands to the diameter shown as w1. As treated waste is purged from the tank, the curtain 36 contracts along the diameter now shown as w2. This expansion and contraction is shown schematically in FIGS. 7B-C wherein the floating ring and ballast chain maintain the upper and lower circumferential rings of the containment tank at relatively constant diameter, and the curtain 36 expands or contracts in diameter thus increasing and decreasing the volume of the tank 32 as water is pumped into and out of the tank 32.

Figure 9:
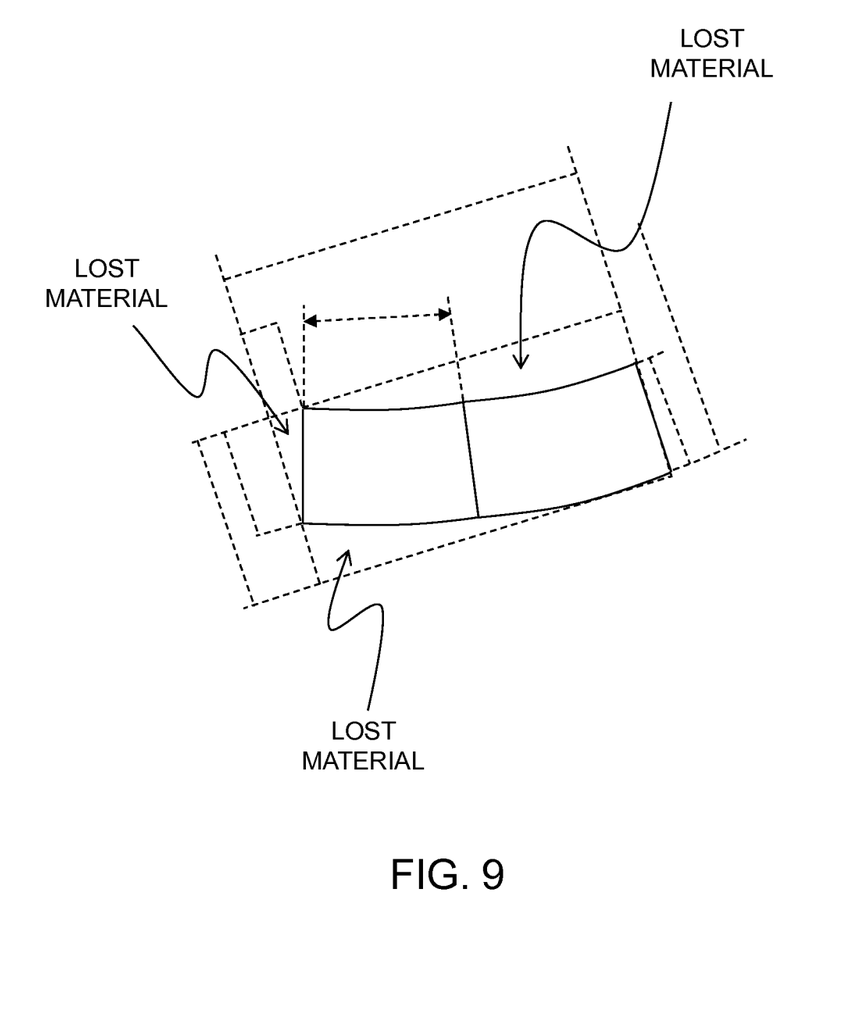
FIG. 9 is a plan view of a material template for a curtain section of the containment system.

This resulting donut shape of the curtain material as the tank 32 expands and contracts is complicated to precisely reproduce and manufacture when cutting material for the curtain segments 66. For example, if the material is segmented into 16 sections or segments, then 37% of material is lost "Lost Material" due to panel cutting and sewing as shown in FIG. 9. This can significantly increase the material and fabrication costs. To reduce this expense, the material may be assembled in rectangular sections or segments as shown. Using this construction method, manufacturing time is decreased. There will be extra material at the upper and lower portions of the curtain, i.e. at the top and bottom edges, however such extra material ensures that the dimensions of the curtain are sized such that the desired expanded and contracted volume is obtained during use. The determination of the net displaced volume may be verified analytically and/or by using computer models.

The volume of the tank can be modified by adjusting the size of the curtain material. As an example, a tank 32 having a 125 ft diameter ring 34 having twelve sides or curtain segments 66 and a tank depth D of 16 ft, the static volume inside the formed chamber would be 1,452,080 gallons. Using these dimensions as an example, the total length L of the curtain will be 433 ft with a depth d of 22 ft. In this example, for every linear foot of top ring 34 or lower ballast chain 38, there will be 13.2 inches of material. This may result in some material bunching together at certain locations but should not affect the overall design due to the construction and support methods employed.

Figure 8A:
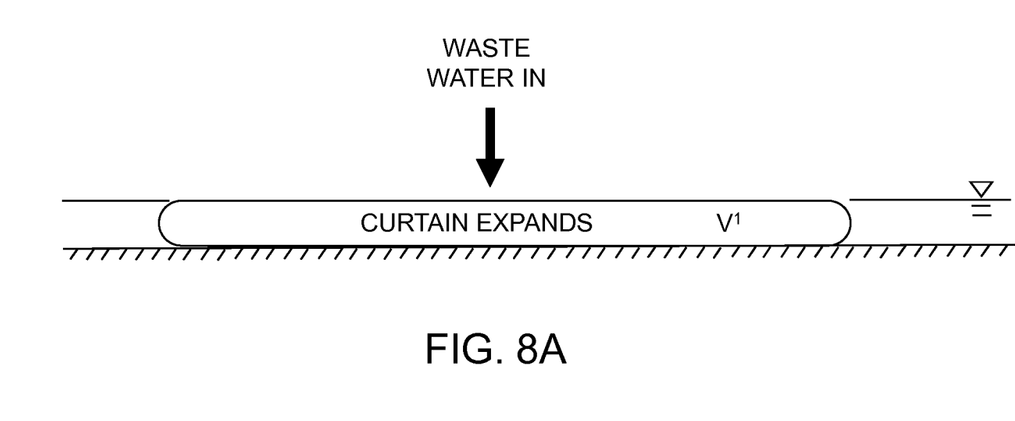
FIGS. 8A and 8B is a diagrammatic representation of a profile view of the containment system in an expanded state and contracted state.
Figure 8B:
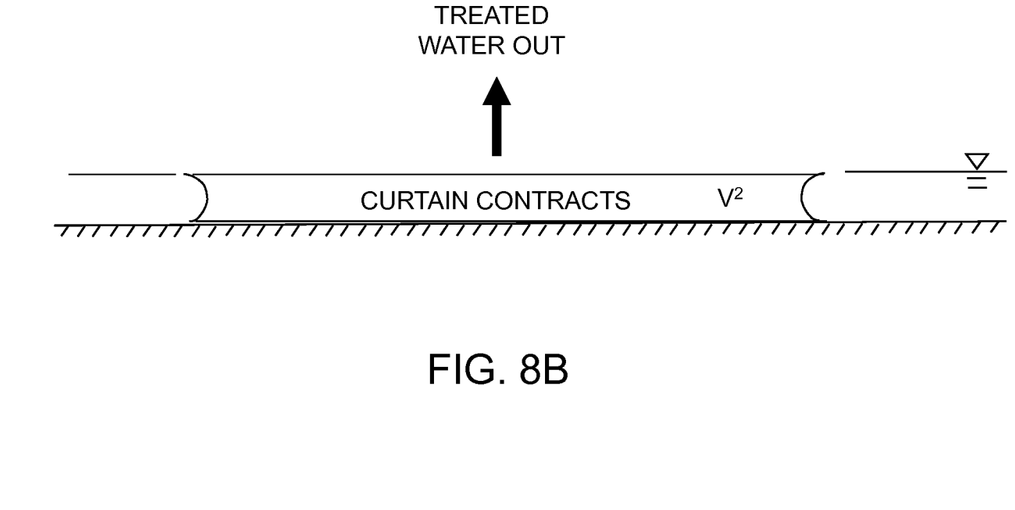

In this example, the curtain is constructed to maximize the batch of sewage treated, so that the curtain material is sized such that it can expand (i.e. bulge outwards) to increase the tanks volume $V^1$ to 1,701,500 gallons as shown in FIG. 8A. The curtain material is flexible and resilient; so that when water is removed from the chamber the material collapses inwards, as shown in FIG. 8B, ensuing in a reduced volume $V^2$ of 1,255,090 gallons. This results in a discharge volume of 446,000 gallons.

The shape of the system will remain sound due to the rigid upper ring 34 and ballast chain 38 with the chain, sewed into a pouch or tube 46 along the bottom portion of the curtain 36, having the same perimeter length as the top ring 34. The combination of webbing 62 along the top ring 34 and at the ballast chain 38 at the bottom will allow the material to settle into an equilibrium state. Table 4 lists the general geometric properties of a first embodiment of the LBTS.

TABLE 4

Geometric properties of the LBTS.

| Parameter | Value |
| --- | --- |
| Overall diameter | 125 ft |
| System depth | 16 ft |
| Static volume | 1,452,080 gal |
| Maximum (expanded) volume | 1,701,500 gal |
| Minimum (collapsed) volume | 1,255,090 gal |
| Maximum discharged volume | 446,410 gal |

For shipping and assembly purposes, the curtain material can be sectioned into for example a number of 25 ft lengths, with one remaining 8 ft or 33 ft panel to complete the system. If needed the length of each section can be adjusted as long as the total length of the material equals 433 ft to accommodate the waste treatment volumes.

The full system hydrostatics for this example, are presented in Table 5. The worst case condition occurs when the curtain 36 is fully suspended by the flotation ring 34. The ring 34 provides a total of 6786 lbf of buoyancy. When the curtain (362 lbf, in-water weight), chain (1213 lbf, in-water weight) and securing hardware are taken into consideration, the ensuing reserve buoyancy of the LBTS is 5211 lbf. The center of gravity and buoyancy locations are referenced from the center of the top ring.

TABLE 5

The LBTS hydrostatics including the center of gravity and center of buoyancy.

| Parameter | Value |
| --- | --- |
| Flotation rim buoyancy | 794 lbf |
| Flotation rim weight | 200 lbf |
| Curtain buoyancy | 1081 lbf |
| Curtain weight | 1443 lbf |
| Chain buoyancy | 176 lbf |
| Chain weight | 1390 lbf |
| Resulting system buoyancy[a] | 5211 lbf |
| Center of Gravity ($C_g$) | −6.02 ft |
| Center of Buoyancy ($C_b$) | −1.06 ft |

[a]Assumes that the flotation ring supports the ballast chain.

The curtain material is under limited force loads due to equal hydrostatic forces on both sides of the material. If excess sewage is added to the LBTS, waste water will either seep below the curtain or spill over the rim. In the case of the latter, the stress in the baffle is proved to be minimal. Using the dimensions described above, a fully submerged flotation ring would result in an unreinforced curtain stress of 401 psi, 2.8% of its yield strength. Sewing the nylon webbing into the fabric as described significantly reduces this stress factor.

The invention has been described in detail with particular reference to certain preferred embodiments thereof, but it will be understood that variations and modifications can be effected within the spirit and scope of the invention.

What is claimed is:
1. A lagoon batch treatment system for treating fluid in a lagoon comprising:
a floating ring supporting a containment curtain in the lagoon having a first end affixed to the floating ring and a second end depending substantially below the first end to define a containment portion of the lagoon, the float- ing ring comprising a plurality of separate sections having a base plate and extension connectors;

a ballast affixed to the second end of the containment curtain; and a pump apparatus for providing fluid into the containment portion of the lagoon and pumping fluid out of the containment portion; and wherein the containment portion has a variable volume depending on at least one of the pressure and volume inside the containment portion.

2. The lagoon batch treatment system of claim 1 wherein the containment curtain expands and collapses relative to the lagoon dependent upon at least one of the pressure and volume inside the containment portion.

3. The lagoon batch treatment system of claim 2 wherein the containment curtain has a length between the first and second ends which is greater than the depth of fluid in the lagoon to facilitate expansion and collapse of the containment curtain relative to the lagoon.

4. The lagoon batch treatment system of claim 3 wherein the extension connectors of the ring each extend at an acute angle from the base plate to form a rim of the containment portion.

5. The lagoon batch treatment system of claim 2 wherein the containment curtain has a circumferential dimension greater then a circumferential length of the floating ring to facilitate expansion and collapse of the containment curtain relative to the lagoon.

6. The lagoon batch treatment system of claim 1 wherein the ballast is provided with a circumferential length substantially the same as the floating ring.

7. The lagoon batch treatment system of claim 1 wherein the containment curtain consists of geomembrane material and reinforced nylon webbing.

8. The lagoon batch treatment system of claim 7 wherein the reinforced nylon webbing of the containment curtain is sewn into the geomembrane material.

9. The lagoon batch treatment system of claim 1 wherein the containment curtain is assembled in rectangular sections.

10. The lagoon batch treatment system of claim 1 wherein the floating ring is of a buoyancy to maintain the first end of the containment curtain at a surface of the lagoon.

11. The lagoon batch treatment system of claim 1 wherein the ballast is of a weight necessary to maintain contact of the second end of the containment curtain to a bottom of the lagoon.

12. A method of treatment of sewage within a lagoon comprising the steps of:

securing one or more connectors to one or more base plates to form one or more buoyant sections;

affixing one or more buoyant sections to a first end of a containment curtain;

affixing a ballast to a second end of the containment curtain;

connecting a first end of the one or more buoyant sections to a second end of the one or more buoyant sections to form the containment curtain in a ring;

submerging the second end and the ballast of the containment curtain in a lagoon; and varying the volume inside the containment curtain by pumping fluid in and out of an area defined within the containment curtain.

13. The method of treatment of sewage within a lagoon of claim 12 further comprising the step of affixing the one or more connectors to the one or more base plates at an acute angle to assist in forming a ring.

14. The method of treatment of sewage within a lagoon of claim 12 further comprising the step of fabricating the containment curtain of geomembrane material with nylon reinforced webbing.

15. The method of treatment of sewage within a lagoon of claim 12 further comprising the step of fabricating the containment curtain in rectangular sections.

\* \* \* \* \*